United States Patent [19]

Meredith

[11] 4,310,248

[45] Jan. 12, 1982

[54] COLOR CONTROL SYSTEM

[76] Inventor: Nolan J. Meredith, 251 North Rd., Oyster Bay Cove, N.Y. 11771

[21] Appl. No.: 143,177

[22] Filed: Apr. 24, 1980

[51] Int. Cl.³ .......................... G01J 3/46; G01J 3/52
[52] U.S. Cl. ................................ 356/402; 356/422; 356/425
[58] Field of Search ............... 356/243, 402, 416, 419, 356/421, 422, 425

[56] References Cited

U.S. PATENT DOCUMENTS 3,890,048 6/1975 Abbondio et al. .................. 356/425

*Primary Examiner*—Vincent P. McGraw
*Attorney, Agent, or Firm*—Kane, Dalsimer, Kane, Sullivan and Kurucz

[57] ABSTRACT

A color control system for color separation, developing and printing fields including a plurality of strips of film with each strip containing color information and combining to form a color proof. A proof can be analyzed by eye or compared with a control wedge with conforming color information. The proof includes grey balance material visible from highlight through shadow to render grey when all colors are trapping correctly and show color differences on the proof when the colors are not trapping correctly. Color change indicators are on the proof to indicate unacceptable two color combination or an excess of a percentage of a contaminating color in a three color arrangement. Slur controls are on the proof to determine color slurring and permit the analysis of the percentage of color slurring when the proof is compared with later proofs or a control wedge. Highlight and shadow dots are provided to be viewed at chosen times to assure that the dots remain equal to each other with respect to each color in highlight and shadow at all times. Thus the color characteristics and color changes can be monitored at all times to enable the operator to make appropriate mechanical adjustments so that color control is maintained at a high quality level. Also, solid color patches of various colors can be provided to permit direct densitometer readings for comparison with recommended readings as a further color analysis check.

20 Claims, 3 Drawing Figures

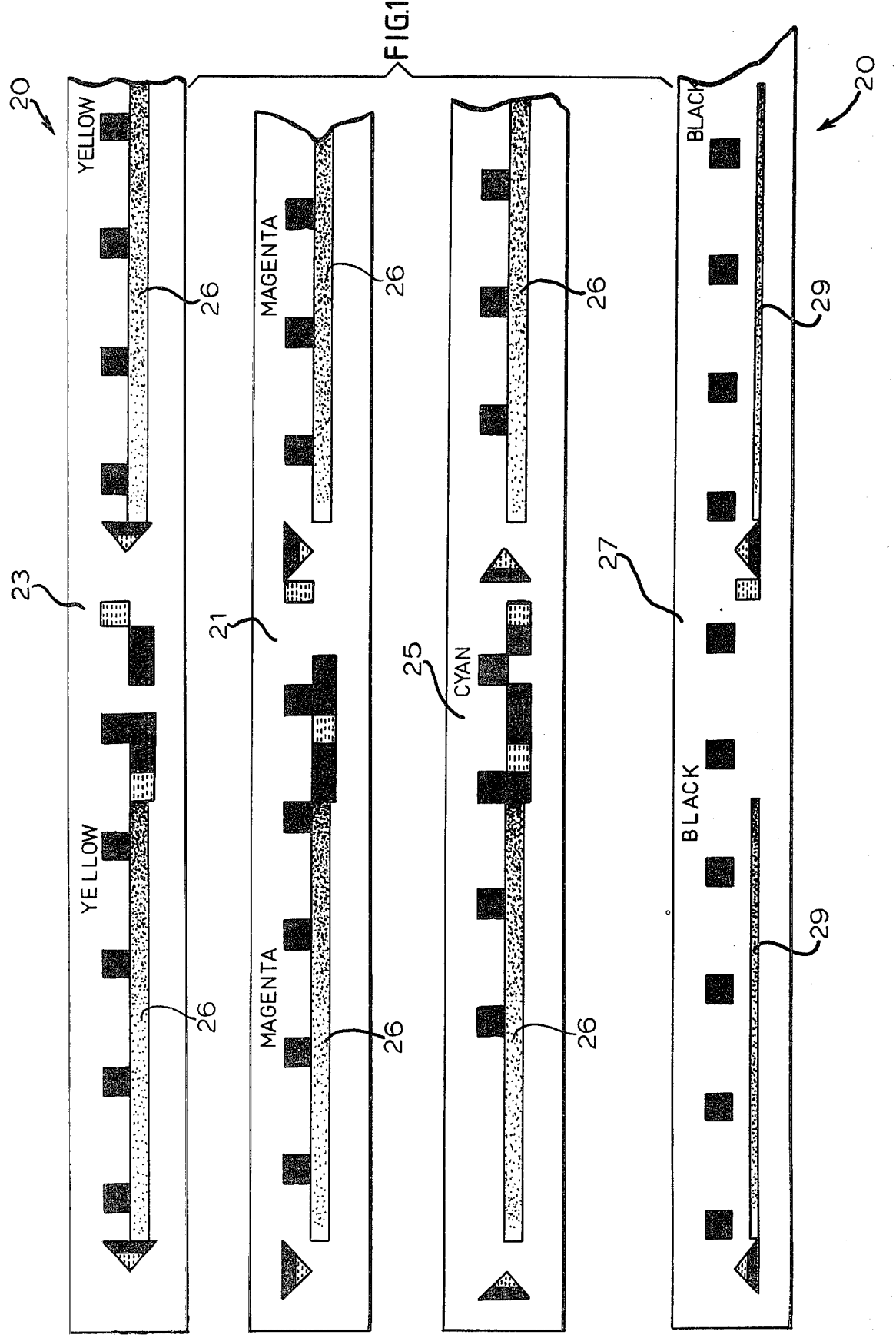

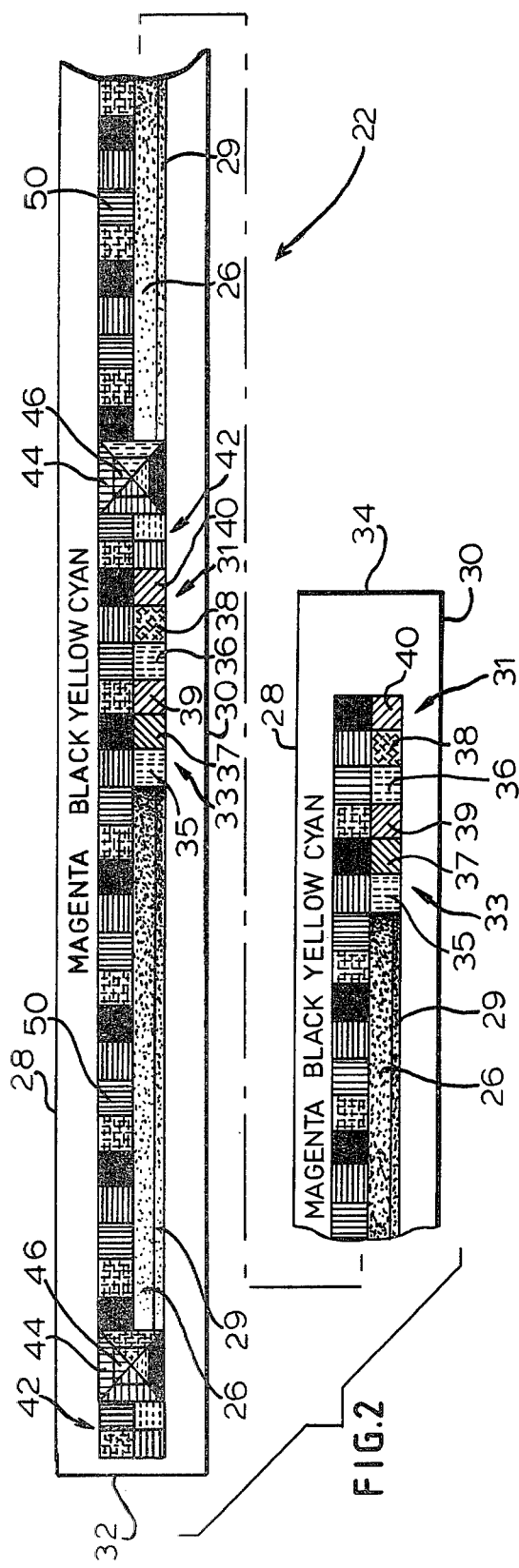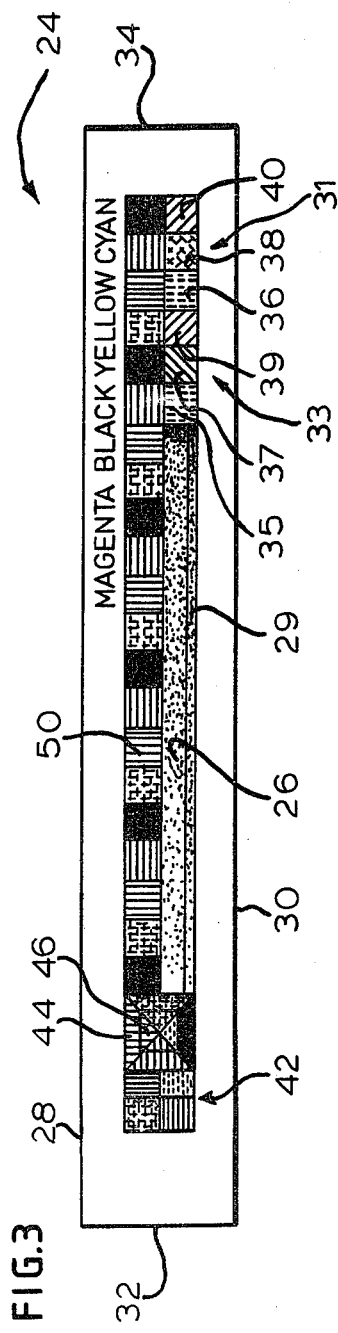

COLOR CONTROL SYSTEM

BACKGROUND OF THE INVENTION

In color photography today advanced technology has developed into rather sophisticated procedures. Included is the laser separation process directed particularly to the four color printing field. Laser separation permits the separation of the colors into four basic primary colors which are then utilized in developing and printing procedures to arrive at a high quality printed color product. Various procedural steps include progress proofing, stripping and composing, plate burning or making, and printing. At all or any one of these stages it is desirable to check the quality of the color reproduction so that color standards are maintained at the highest level.

In particular, in color printing operation, it is a difficult procedure for the printer to monitor inks of different colors supplied to the press so that the finished proofs are consistent and have the highest desirable quality of color reproduction. In fact, today the printer operates mostly by trial and error. If he finds that the color is not as it should be, he makes random adjustments to the press until he gets an acceptable proof. This is a time consuming and costly process. Furthermore, there is no guarantee that once he obtains a satisfactory proof the color conditions will remain constant through a long run of a large number of color prints. The printers do not have means to monitor and periodically check, analyze and control the colors so that a high quality product is obtained throughout the printing process. At present if the printer does make periodic checks and finds an unacceptable grade of product he must once again randomly and by trial and error adjust his press. It is clear that this procedure is unacceptable and does not enhance the standards in the printing field.

Various attempts have been made to provide additional controls for use of the printer or by an operator in the pre-printing procedure to analyze and adjust color characteristics. This primarily had to do with ink conditions. One way in which the color is monitored is by the density of the ink of the various colors on the printed proof. There are various procedures for using a densitometer to check the ink densitites on the proof. This provides one way in which proper adjustment of ink can be accomplished. However, density of ink is not the only reason why proofs do not conform to the color characteristics intended.

It is clear that there is a need for better and more versatile color control systems with color separation, developing and printing industries so that all phases of color conditions can be monitored, checked and adjusted during common procedure to provide a higher quality product more consistently. Also, it is desirable to provide a system which decreases the time needed for adjusting a printing press including the setting up of a press for proper operation and the maintenance of proper operation over an extended period of time to provide a uniform high quality product throughout the printing procedure.

SUMMARY OF THE INVENTION

With the above background in mind, it is among the primary objectives of the present invention to provide a color control system which is designed to monitor, check and indicate where adjustment of color is needed for a wide range of parameters. By monitoring the color, the operator can make appropriate mechanical adjustments in his reproducing equipment so that color quality is maintained at the desirable level. For example, the present system in use in four color printing procedures enable to printer to initially set his press up properly and to maintain control throughout the printing procedure to provide a high quality printed proof and subsequent large numbers of prints quickly and efficiently. The present system provides for cost and time savings in set up and operation. The pressman for the printing press can run the color for the color printing procedure to specifications and predetermined parameters as determined by visual observation of a proof obtained from the press and/or by comparison with a standard color control wedge.

The system is also adaptable for use in preprinting procedures. This would include the steps of progress printing, stripping and composing, and plate burning or making.

It is an objective of the present invention to provide a color control system employing a combination of four strips of film which combine in print to form a quality control proof for color analysis. By eye or by use of a quality control bar or wedge which forms a standard, the operator or printer is able to compare the proof obtained from the films and detect color deficiencies. Thereafter, the deficiencies can be remedied by making appropriate mechanical adjustments. In this manner, by use of the present system a printer, for example, can run his press according to the specifications of the wedge and obtain continuously reproduceable high quality printed material.

There are a number of parameters in the system which are controlled in order to obtain the high quality color printing. The system is particularly adaptable for use in four color printing procedures and systems employing color separation by laser techniques. One parameter that is monitored closely is grey balance. A predetermined percentage of color will render grey when all three primary colors are trapping or printing correctly. This is visible from highlight through shadow. In one form of the invention, a black tone bar is provided for ease of comparison with the grey balance. The operator can continuously monitor grey balance as conventional procedures are followed. For example, a press operator can continuously check his press from day to day by running the films for the proof through to obtain the proof and compare it with a control wedge or view it by eye with or without the assistance of a magnifying glass. If the printer cannot coincide the proof with the wedge or it does not measure up to known quality standards, then he knows that the problem is in the press and does not exist in any film that is being run or about to be run on the press. Thus, in this manner he eliminates the film as being a problem in that circumstance. This avoids the common problem that arises when it is difficult to define why the desired proof is not being obtained, that is whether the problem is in the film or in the press. By use of the present color control system, this problem will be immediately resolved.

A further parameter that is controlled by the color system is the two color trap. In four color printing the colors are broken down into the primary three colors of magenta, yellow and cyan. The fourth color base is black. Combining equal amounts of the three primary colors will also produce black. A combination of any two of the three primary colors will produce a secondary color. For instance, a combination of magenta and yellow will produce orange. A combination of yellow and cyan will produce green. A combination of cyan and magenta will produce purple. Equal percentages of the two primary colors will produce the true secondary color. Means is provided in the system to check the secondary colors to assure that the two primary colors combined to produce the secondary color are trapping properly.

Another parameter controlled by the color system is the three color trap. In this instance, each of the three secondary colors are contaminated with an equal lesser amount of the third primary color. Thus the orange will be covered by a lesser amount of cyan and if the orange turns grey, it means that the cyan is gaining. The green patch is contaminated with a lesser amount of magenta and if the green turns grey it means the magenta is gaining. Similarly, the purple patch is contaminated with a lesser amount of yellow and if the purple turns grey it means that the yellow is gaining. For the two and three color traps, it is common to provide the primary colors in the percentage range of 96%. For three color trap, it is acceptable to provide a contaminating percentage for the third primary color of approximately 67%.

The color control system also includes slur patches designed to tell the operator if the proof has slur in any direction by visual and/or instrument analysis. He can take a densitometer reading on a reference solid slur patch of color or an earlier or later run slur patch and then take a densitometer reading on the chosen slur patch for analysis and immediately determine in percentage the amount of gain. Appropriate mechanical adjustments can then be made to correct the deviation.

A further additional parameter monitored by the present system is the highlight and shadow factors. A highlight dot and a shadow dot are provided for the four color arrangement. Similar to the above discussed parameters, the dots can be monitored during progress proofing, stripping and composing, plate burning and printing of the impression or proof. At all times the dots must remain equal to the dots of the other colors in highlight and in shadow. The operator can put a magnifying glass in the center and over all four colors and immediately be able to see if one color has changed. To facilitate this process, the four colors are triangular wedges arranged to form a square block with the highlight portions in the center and the shadow portions adjacent to the outer edges of the square block. This facilitates the ability of the operator to view all four colors simultaneously and compare them. Observation of the slur patches is also facilitated in this manner.

The four color slur patches are provided in small rectangular configurations arranged together to form a larger rectangular configuration. All four color rectangles are adjacent to one another and can be viewed simultaneously.

A further objective is to provide a means for monitoring the parameters of density of the inks being used for the various colors. For this purpose, the color control system employs solid color patches for all of the different colors being used on the proof and on a corresponding control wedge. In four color printing this would include repeating patches of the three primary colors magenta, yellow, and cyan and the combination black color. A conventional densitometer can then be used to read the density of the color patches on the proof and the readings compared with the density of color patches on a control wedge or against standard density requirement thus providing an additional control in the system.

All of the above controls are quickly and easily utilized with the simplified elements of the system. Only the four strips of film to produce a proof is required. If desired, for ease of use a comparison control wedge can be provided to compare with the proof.

In summary, a color control system for color analysis is provided. The system includes a plurality of strips of film each containing color information. The information is combined when printed to form a color proof. Grey balance means is on the proof visible from highlight through shadow to render grey when all colors are trapping correctly and to show color differences on the proof when the colors are not trapping correctly.

Color change indicating means is provided to indicate on the proof incorrect balance of combined primary colors or excess of contamination of one or more chosen primary colors.

Slur control means can be provided on the proof to indicate slurring of colors. Highlight and shadow dot means can be provided on the proof for use during various stages of color separation, developing and printing. At all times each dot remains equal to the other dots for other colors in highlight and shadow. It is also contemplated that the proof can include color patches which are in position for comparison and for readings by a densitometer.

With the above objectives among others in mind, reference is made to the attached drawings.

BRIEF DESCRIPTION OF THE DRAWINGS

In The Drawings:

FIG. 1 is a plan view of the four strips of film used to form the color proof for the color control system;

FIG. 2 is a plan view of a plurality of color proofs produced by the printing of the film strips of FIG. 1; and FIG. 3 is a plan view of a color control wedge of the system adapted for comparison with the color proof of FIG. 2.

DETAILED DESCRIPTION

As shown in the drawings, the color control system can include three elements. They include four strips of film 20, a color proof 22 and an optionally used color control wedge 24. The film strips are conventional types of film strips used in four color printing with each strip being produced during the conventional type of color separation process, for example laser separation. The strips are usable in conventional printing presses for producing a four color printed finished product. A proof produced by printing of the four strips would conform to color proof 22. In FIG. 2, a series of color proofs 22 are shown since they can be printed in sequence. The system is usable during progress proofing, stripping and composing, plate burning, and printing. For example, it forms a control means for a printing press so that the press operator can accurately control color parameters repeatedly without deviation to provide a high quality product in mass production units. Traditionally, the printing press operator would look at the proofs as they come off the press on a daily basis or more frequently to visually check them for accuracy. This is clearly an inefficient and inaccurate method of printing which often results in unfavorable results as well as great deviations in product particularly for a large run. With the present system, the operator can set up his press initially so that it accurately reproduces the color film and then can monitor the press on a regular basis during the work day and on successive days to be sure that it continuously accurately produces the colors on the finished product.

Each of the four strips 20 includes the color material for the three primary colors and black. Thus, strip 21 is for magenta. Strip 23 is for yellow. Strip 25 is for cyan. Strip 27 is for black. The material on the film strips is positioned so that when the strips are combined and a proof is produced the various individual colors and combination of colors will be formed as shown on proof 22.

Each proof 22 and the color control wedge 24 are identical in layout. In fact when the press is operating correctly the colors on the proof 22 produced from the four strips of film 20 should conform to the colors on the control wedge 24. The control wedge 24 and the proof 22 are designed so that they have a number of parameter controls for the operator to utilize.

One area of control is grey balance. For this purpose, the proof 22 and the control wedge 24 have an elongated grey bar 26 in the central portion. Each proof 22 and wedge 24 is elongated and rectangular in configuration and includes a pair of elongated upper and lower edges 28 and 30 and a pair of opposed shorter lateral edges 32 and 34.

Grey bar 26 is lighther adjacent to lateral edge 32 than the end adjacent to lateral edge 34. It gradually darkens as it extends toward lateral edge 34. Thus the grey bar provides for visibility from highlight through shadow. It has a percentage of color that will render grey when all three primary colors are trapping or printing correctly. Each proof 22 is viewed by eye or instrument or is matched with control wedge 24 which has the perfect grey balance and other color arrangements imprinted thereon. In this manner, the operator will be able to tell if the colors are trapping properly or if mechanical adjustments are necessary. To assist the operator in analyzing the grey balance, a black tone bar 29 is positioned immediately below grey bar 26 and is coextensive therewith. The black tone bar 29 is obtained from the black strip of film 27 and thus is independent of the three primary color strips. If the three primary colors are trapping properly, the grey bar 26 produced by the three primary color film strip will match the black tone bar obtained from the black film strip. If one or more colors are not trapping properly, then the problem will more readily visible observable to the operator by comparison between the adjacent grey bar and black tone bar.

Between grey bar 26 and lateral edge 34 are two sets of three colored squares 31 and 33. Set 31 forms a two color trap and set 33 forms a three color trap. Set 31 include a purple square 36, an orange square 38, and a green square 40. These squares are formed by combining equal percentages of two primary colors. It is conventional for example to employ 96% of each of two colors to form the squares. For example, purple patch 36 is formed by combining the primary colors magenta and cyan. Orange patch 38 is formed by combining equal amounts of magenta and yellow. Green patch 40 is formed by combining equal amounts of yellow and cyan. If the two primary colors are not trapping correctly in forming any of the patches of group 31, the operator will be able to detect this by visual observation, by instrument or by comparison with control wedge 34 which has a similar group of patches. Appropriate mechanical adjustments can then be made.

The set of patches 33 between set 31 and grey bar 26 includes the same arrangement of basic secondary colors. Thus, an orange patch 37 is sandwiched between a purple patch 35 and a green patch 39. These patches are formed by providing equal percentages of two primary colors in the same manner as the group 31 is formed. Conveniently approximately 96% of each color is utilized. Additionally, group 33 includes a contaminating primary color of lesser percentage to form the three color trap. Thus purple patch 35 is contaminated with yellow, orange patch 37 is contaminated with cyan and green patch 39 is contaminated with magenta. It has been found to be acceptable to contaminate at a percentage of approximately 67% in comparison to the 96% for the other two basic primary colors to form the secondary color. Accordingly, if any of the three primary colors exceeds the approximate 67% figure, the appropriate patch will turn grey. On purple patch 35 will turn grey if yellow gains. Orange patch 37 will turn grey if cyan gains. Green patch 39 will turn grey if magenta gains.

Also on proof 22 and wedge 34 are slur patches 42. These tell the operator if any one or more of the proofs shows that color has slurred. Appropriate mechanical corrections can then be made. Slur will be detected in any direction on appropriately corrected. A series of proofs 22 can be compared, an individual proof 22 can be viewed and analyzed, or the proof 22 can be compared with wedge 24 in regard to slur patches 42. There is a slur patch 42 for each of the four colors, yellow, magenta, cyan and black and a densitometer can be employed to read on a solid patch of color and then on the appropriate slur patch 42 if he wishes to be appraised of the percentage of amount of color gain. For ease of use, the four differently colored slur patches 42 are formed as small rectangles and are arranged in side by side arrangement to form a larger rectangle. Thus, the operator can easily view all four slur patches 42 at one time since they are close together and easily viewable by eye or by instrument.

A further control parameter is located between slur patches 42 and the grey bar 26. They are in the form of a highlight dot 44 and a shadow dot 46 for each of the four colors. The highlight and shadow dots for each color are combined to form a triangular configuration with the highlight dot forming the apex portion of the triangle and the shadow dot forming the remaining base portion. The triangular dots are arranged into a square configuration with the highlight dots 44 on the inside and the shadow dots 46 on the outside of the square. By locating these dots in this arrangement, once again, all of the dots can be viewed at once for all four colors by the operator by eye or by instrument for ease and efficiency of comparison in use. These dots are used during various stages. For example, they are used during progress proofing, stripping and composing, plate burning, and printing of the proof or impression. At all times dots 44 and 46 must remain equal to each other for each color in highlight and shadow. In order to monitor this factor, the operator need only put a magnifying glass in the center and of all four colors and he can immediately see if one color has changed.

A further control parameter on wedge 24 and proof 22 are solid color patches 50 corresponding to the four colors used in the four color printing procedure. They are placed in the depicted embodiment above grey bar 26 in a row parallel to the grey bar. Color patches 50 can be read by a densitometer and compared with corresponding color patches on control wedge 24 or standard readings to see if ink density must be adjusted for any of the colors being used. In the depicted form, there are patches 50 arranged along the bar to fill the space between dots 44 and 46 and slur patches 42. Thus they fill the only remaining space on the compact arrangement of parameter indicators. In this manner, proof 22 utilizes a minimum amount of space while employing a maximum number of parameter testing mechanisms.

By periodically using the system as described above, a printer is able to detect when his printing press is failing to operate properly and is able to run the color to specifications which are closely monitored and controlled by the system in contrast to merely using his eye to determine if a proof is acceptable or not and then randomly trying to adjust his press.

The above embodiment is directed to four color printing procedures with laser separation techniques. Naturally it is equally adaptable to other well known separation, developing and printing techniques. With this in mind various modifications not affecting the operation of the present system can readily be visualized and employed. For example, a change in the number of colors would correspondingly change the number of strips of film.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A color control system for color analysis in the color separation, developing and printing fields comprising; a plurality of strips of film each containing color information and combining when printed to form a color proof, and grey balance means on the proof visible from highlight through shadow to render grey when all colors are trapping correctly and show color contamination on the proof when the colors are not trapping correctly to indicate required adjustments in order to control the color produced.

2. The invention in accordance with claim 1 wherein a color control wedge is provided with conforming color information for comparison with the color proof and to facilitate detection of unacceptable color conditions on the proof.

3. The invention in accordance with claim 1 wherein a black tone bar is provided for comparison with the grey balance means to facilitate determination of whether all colors are trapping correctly and the grey balance means is rendering grey from highlight through shadow.

4. The invention in accordance with claim 1 wherein there are four strips with each strip containing color information relating to a different color, and the four colors being magenta, yellow, cyan and black.

5. The invention in accordance with claim 1 wherein two color change indicating means is on the proof to indicate on the proof an incorrect balance between two chosen colors occurring when one of the two colors is not trapping correctly.

6. The invention in accordance with claim 1 wherein three color change indicating means is on the proof to indicate on the proof an excess of contamination of a chosen contaminating color normally appearing in a lesser percentage than the two other chosen colors.

7. The invention in accordance with claim 1 wherein slur patches are on the proof so that comparison between the slur patches on the proof and slur patches on further printed proofs will indicate when one or more colors are slurring.

8. The invention in accordance with claim 1 wherein highlight and shadow dots are on the proof and are used to monitor the relationship between the colors of the dots so that the dots remain substantially equal to each other in highlight and shadow.

9. The invention in accordance with claim 1 wherein the grey balance means is rendered grey when the three primary colors of magenta, yellow and cyan are trapping correctly.

10. The invention in accordance with claim 1 wherein the grey balance means includes a grey bar extending longitudinally along a central portion of the proof, the proof being rectangular in configuration and the grey bar getting progressively darker as it is viewed from one end to the other.

11. The invention in accordance with claim 5 wherein the two color change indicating means includes three side by side purple, orange and green blocks, the orange block being formed of equal amounts of magenta and yellow, the green block being formed by equal amounts of yellow and cyan and the green block being formed by equal amounts of cyan and magenta and observation of the blocks on the proof will indicate improper relationships between the two colors on each block.

12. The invention in accordance with claim 6 wherein the three color change indicating means includes three side by side blocks of orange, green and purple color respectively, the orange block being formed by equal amounts of magenta and yellow and having a lesser contaminating amount of cyan so that the block will turn to grey if cyan has gained, the green block being formed of equal amounts of yellow and cyan and a lesser contaminating amount of magenta so that the green block will turn grey if magenta has gained, and the purple block being formed of equal amounts of cyan and magenta and a lesser contaminating amount of yellow so that the purple block will turn grey if yellow has gained.

13. The invention in accordance with claim 7 wherein the slur control means includes a plurality of rectangular slur patches arranged on the proof to form a larger rectangular slur control means, the four patches being yellow, magenta, cyan and black respectively and being responsive to a densitometer reading so that a densitometer comparison can be made between the slur patches on the proof and other corresponding slur patches to determine the percentage of the amount of gain and if there is a need for color adjustment.

14. The invention in accordance with claim 8 wherein the highlight and shadow dots are rectangular in configuration and there are four dots arranged to form a square, the dots being magenta, yellow, cyan and black respectively, and the dots adapted to be used during progress proofing, stripping and composing, plate burning, and printing the impression to form the color proof with the dots remaining equal to each other for each color in highlight and shadow during all processing steps whereby visual observation of the dots will determine when the dots are unequal and indicating adjustments that are required.

15. The invention in accordance with claim 1 wherein a plurality of solid patches of black, yellow, magenta, and cyan in groups of four are arranged in a row of groups and are in position and are adapted for densitometer recommended readings for the respective colors.

16. A method of analyzing and controlling color in the color separating, developing and printing fields comprising; combining a plurality of strips of film each containing color information to form a color proof, and monitoring the grey balance on the proof visible from highlight through shadow to render grey when all colors are trapping correctly and show color contamination on the proof when the colors are not trapping correctly by observing a grey bar on the proof to determine when adjustments need be made to conform the proof with a standard and accordingly maintain high quality color.

17. The invention in accordance with claim 16 wherein a color control wedge is provided with conforming color information for comparison with the color proof and to facilitate detection of unacceptable color conditions on the proof.

18. The invention in accordance with claim 16 wherein a black tone bar is provided for comparison with the grey balance means to facilitate determination of whether all colors are trapping correctly and the grey balance means is rendering grey from highlight through shadow.

19. The invention in accordance with claim 16 wherein there are four strips with each strip containing color information relating to a different color, and the four colors being magenta, yellow, cyan and black.

20. The invention in accordance with claim 16 wherein two color change indicating means is on the proof to indicate on the proof an incorrect balance between two chosen colors occurring when one of the two colors is not trapping correctly.

* * * * *

UNITED STATES PATENT AND TRADEMARK OFFICE
CERTIFICATE OF CORRECTION

PATENT NO. : 4,310,248
DATED : January 12, 1982
INVENTOR(S) : Nolan J. Meredith

It is certified that error appears in the above—identified patent and that said Letters Patent is hereby corrected as shown below:

Insert Claims 21-30, as part of Letters Patent 4,310,248.

Claim 21. The invention in accordance with Claim 16 wherein three color change indicating means is on the proof to indicate on the proof an excess of contamination of a chosen contaminating color normally appearing in a lesser percentage than the two other chosen colors.

Claim 22. The invention in accordance with Claim 16 wherein slur patches are on the proof so that comparison between the slur patches on the proof and slur patches on further printed proofs will indicate when one or more colors are slurring.

Claim 23. The invention in accordance with Claim 16 wherein highlight and shadow dots are on the proof and are used to monitor the relationship between the colors of the dots so that the dots remain substantially equal to each other in highlight and shadow.

UNITED STATES PATENT AND TRADEMARK OFFICE
CERTIFICATE OF CORRECTION

PATENT NO. : 4,310,248
DATED : January 12, 1982
INVENTOR(S) : Nolan J. Meredith

It is certified that error appears in the above—identified patent and that said Letters Patent is hereby corrected as shown below:

Claim 24. The invention in accordance with Claim 16 wherein the grey balance means is rendered grey when the three primary colors of magenta, yellow and cyan are trapping correctly.

Claim 25. The invention in accordance with Claim 16 wherein the grey balance means includes a grey bar extending longitudinally along a central portion of the proof, the proof being rectangular in configuration and the grey bar getting progressively darker as it is viewed from one end to the other.

UNITED STATES PATENT AND TRADEMARK OFFICE
CERTIFICATE OF CORRECTION

PATENT NO. : 4,310,248
DATED : January 12, 1982
INVENTOR(S) : Nolan J. Meredith

It is certified that error appears in the above—identified patent and that said Letters Patent is hereby corrected as shown below:

Claim 26. The invention in accordance with Claim 20 wherein the two color change indicating means includes three side by side purple, orange and green blocks, the orange block being formed of equal amounts of magenta and yellow, the green block being formed by equal amounts of yellow and cyan and the green block being formed by equal amounts of cyan and magenta and observation of the blocks on the proof will indicate improper relationships between the two colors on each block.

Claim 27. The invention in accordance with Claim 21 wherein the three color change indicating means includes three side by side blocks of orange, green and purple color respectively, the orange block being formed by equal amounts of magenta and yellow and having a lesser contaminating amount of cyan so that the block will turn to grey if cyan has gained, the green block being formed of equal amounts of yellow and cyan and a

UNITED STATES PATENT AND TRADEMARK OFFICE
CERTIFICATE OF CORRECTION

PATENT NO. : 4,310,248

DATED : January 12, 1982

INVENTOR(S) : Nolan J. Meredith

It is certified that error appears in the above—identified patent and that said Letters Patent is hereby corrected as shown below:

lesser contaminating amount of magenta so that the green block will turn grey if magenta has gained, and the purple block being formed of equal amounts of cyan and magenta and a lesser contaminating amount of yellow so that the purple block will turn grey if yellow has gained.

Claim 28. The invention in accordance with Claim 22 wherein the slur control means includes a plurality of rectangular slur patches arranged on the proof to form a larger rectangular slur control means, the four patches being yellow, magenta, cyan and black respectively and being responsive to a densitometer reading so that a densitometer comparison can be made between the slur patches on the proof and other corresponding slur patches to determine the percentage of the amount of gain and if there is a need for color adjustment.

UNITED STATES PATENT AND TRADEMARK OFFICE
CERTIFICATE OF CORRECTION

PATENT NO. : 4,310,248
DATED : January 12, 1982
INVENTOR(S) : Nolan J. Meredith

It is certified that error appears in the above—identified patent and that said Letters Patent is hereby corrected as shown below:

Claim 29. The invention in accordance with Claim 23 wherein the highlight and shadow dots are rectangular in configuration and there are four dots arranged to form a square, the dots being magenta, yellow, cyan and black respectively, and the dots adapted to be used during progress proofing, stripping and composing, plate burning, and printing the impression to form the color proof with the dots remaining equal to each other for each color in highlight and shadow during all processing steps whereby visual observation of the dots will determine when the dots are unequal and indicating adjustments that are required.

UNITED STATES PATENT AND TRADEMARK OFFICE
CERTIFICATE OF CORRECTION

PATENT NO. : 4,310,248
DATED : January 12, 1982
INVENTOR(S) : Nolan J. Meredith

It is certified that error appears in the above—identified patent and that said Letters Patent is hereby corrected as shown below:

Claim 30. The invention in accordance with Claim 16 wherein a plurality of solid patches of black, yellow, magenta, and cyan in groups of four are arranged in a row of groups and are in position and are adapted for densitometer recommended readings for the respective colors.

On The Title Page, "20 Claims" should read -- 30 Claims --.

Signed and Sealed this

Eighth Day of June 1982

|SEAL|

*Attest:*

*Attesting Officer*

GERALD J. MOSSINGHOFF
*Commissioner of Patents and Trademarks*